April 22, 1941.   G. R. SHAW   2,239,255
VENTILATING DEVICE
Filed Feb. 17, 1938

G. R. Shaw
Inventor
By Glascock Downing & Seebold
Attys.

Patented Apr. 22, 1941

2,239,255

UNITED STATES PATENT OFFICE 2,239,255

VENTILATING DEVICE

George Reuben Shaw, Brighton, Victoria, Australia, assignor to Chatsworth Investments Proprietary Limited, Melbourne, Victoria, Australia, a company of Victoria, Australia Application February 17, 1938, Serial No. 191,089
In Australia February 25, 1937

7 Claims. (Cl. 156—14)

This invention relates to improvements in and connected with ventilating devices and refers especially, but is not limited, to ventilating devices for permitting fresh air to pass to and impure air to pass from pantries, cupboards, wardrobes, lockers and like confined spaces.

It is customary to provide the doors or walls of small rooms, the sides or other parts of cupboards, or the like with rectangular or other shaped openings having small louvres, pieces of perforated sheet metal or wire gauze fitted within or thereover whereby a more or less free ingress and egress of air is provided to ensure a desired ventilating of an enclosed space and flies and other insects can be excluded therefrom. These known forms of ventilating devices are objectionable in that they are unsightly in appearance and therefore are frequently placed in positions which do not permit of them functioning to ensure the most satisfactory ventilative action.

Now, the object of the present invention is to provide a simple and durably constructed ventilating device of neat and pleasing appearance which can be easily and quickly applied to correspondingly shaped apertures formed in the doors, walls or other parts of pantries, cupboards, small rooms and other confined spaces whereby an effective ventilation of the same can be achieved without if so desired, permitting the ingress of insects thereto.

The abovementioned object is accomplished by providing a ventilating device comprising a short tubular member furnished with a peripherally disposed flange and with a covering of wire mesh or other foraminous material at one end and having its sides or opposite end furnished with resilient fingers having circumferentially engaging members adapted to grip the sides of a hole formed in a door, wall or other part of a pantry, cupboard or other room or article of furniture when the device is inserted therein.

The resilient fingers are so formed that they will yield or be compressed more or less freely when the device is being inserted into a hole corresponding in shape to the cross section of the tubular member, and when inserted therein the engaging members thereon will grip the sides of the hole with sufficient pressure to retain the device securely in position.

In order that the invention, the object and nature of which have been set forth, may be readily understood, reference will now be made to the accompanying sheet of explanatory drawings, wherein.

Figure 1:
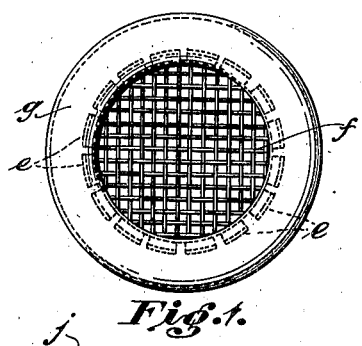
Figure 1 is a view in front elevation of one form of ventilating device constructed in accordance with the invention.
Figure 2:
Figure 2 is a view in side elevation of Figure 1.
Figure 3:
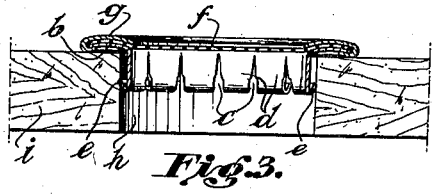
Figure 3 is a view in sectional side elevation of the device and shows the same inserted in a hole in a section of a panel.
Figure 4:
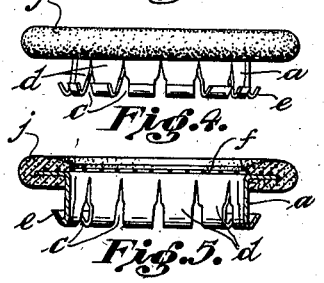
Figures 4 and 5 are views in side elevation and sectional side elevation, respectively, of a ventilating device, and shows an alternative method of securing the wire mesh to the flange thereof.

In the drawing, like characters of reference are employed to indicate the same or corresponding parts in the different views and in Figures 1 to 5 the letter $a$ designates a short split tubular member having a peripherally disposed flange $b$ at the outer end thereof. The flanged tubular member $a$ may be shaped from resilient sheet metal, and is provided with a plurality of spaced longitudinal incisions $c$ which extend from the inner end near to the flange $b$. The longitudinal incisions $c$ can be spaced at suitable distances apart so that the material therebetween will form a plurality of resilient fingers $d$, having their ends bent outwardly to form a series of circumferential engaging members $e$ which are disposed at an acute angle to the fingers and incline toward the flange $b$.

A disc of foraminous material $f$ is located over the peripheral flange $b$ and is secured firmly thereon by folding the outer part of an annular ring $g$ of sheet metal about the outer edges of the disc $f$ and flange $b$. The orifice in the ring $g$ is of the same size or substantially the same size as, and aligns with, the hole in the tubular member and the outer part of the ring is given any approved shape that will impart a pleasing appearance to the device.

The tubular member *a* of the ventilating device is inserted in a hole *h* formed in a panel *i* (see Figure 3) or other part of a door or wall of a room, article of furniture or the like so that the clamping ring *g* on the outer end will bear neatly against the outer face of the said panel or wall.

The converging outer faces of the engaging members *e* on the inner ends of the resilient fingers *d* of the tubular member enables the device to be more or less easily inserted into the hole and the said engaging members are disposed in such a way that they will grip the sides of, and prevent the withdrawal of the device from, the hole.

The resilient fingers *d* will enable the device to readily adapt itself to the size of the hole to take the same and they can be easily spread or opened out to provide a tighter engagement with the sides thereof or to fit a larger hole, when required. Moreover, the widths of the incisions *c* is such that the fingers can be sprung inwardly or depressed sufficiently to enable them to enter a hole of smaller diameter.

The engaging members can be formed during the shaping of the tubular member or after the same has been drawn or pressed from a sheet of thin resilient metal.

Figure 5:

In lieu of employing a folded ring, as *g*, to securely clamp the disc of wire mesh or other foraminous material to the outer end of the tubular member, these parts may be secured together by moulding a ring *j* thereon from suitable plastic material as shown in Figure 5.

Figure 6:
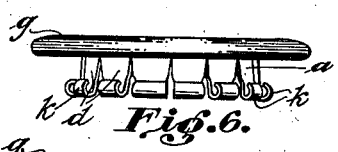
Figures 6 and 7 are views in side elevation and sectional side elevation, respectively, of a ventilating device and shows an alternative form of aperture engaging member on the split tubular portion thereof.
Figure 7:

Instead of providing the ends of the resilient fingers *d* with acutely turned circumferential engaging members *e*, they can be formed with outwardly rolled or partially rolled beads *k* as shown in Figures 6 and 7 of the drawing. The rolled beads are so formed that they will enable the device to be readily inserted into a hole of slightly less diameter and will frictionally retain the device therein.

Figure 8:
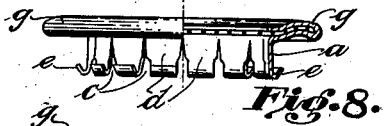
Figure 8 is a view in side elevation, partly in section, showing a modification in the construction of the ventilating device.

In lieu of connecting the foraminous disc *f* to the flange *b* on the outer end of the tubular member by means of a folded ring *g*, the said disc can be secured in position by folding the outer edge of the said flange *b* inwardly over the said disc as shown in Figure 8 of the drawing. It will be understood that in this form of the invention, the flange *b* is made wide enough to provide ample material to form the overlapping fold.

Figure 9:
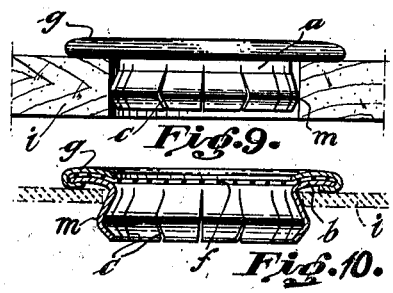
Figures 9 and 10 are views in side elevation and sectional side elevation of a ventilating device having different forms of retaining or engaging members on the sides of the tubular portion thereof.
Figure 10:
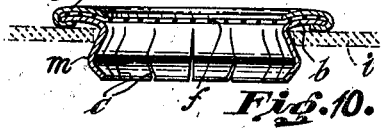

In the form of the invention shown in Figures 9 and 10, the circumferentially engaging members are shaped by bending the resilient fingers outwardly intermediate the ends thereof to form angular ridges *m* which will frictionally engage the interior of a hole in a panel (Figure 9) or will pass through and retain the device in a hole in a thin panel of wood or metal (see Fig. 10). The taper of the inner parts of the angular ridges will enable the device to be readily inserted into a hole *h* and the oppositely tapered outer parts of the angular ridges may bear with resilient pressure on the outer edge of a hole formed in a thin panel of metal or wood.

In Figure 10 the ridge shaped engaging members are shown wider than the ridge shaped engaging members in Figure 9, and the outer tapered portions thereof extend from the ridges to, or close to the flange *b* whereby they will resiliently engage the sides of a hole in a thin panel.

In lieu of forming the engaging members *m* in the shape of an angular ridge they can be given a curved outline of approved size and shape. In the form of the device shown in Figures 11 and 12, the inner portions of the resilient fingers *d* are bent outwardly at an acute angle to the sides of the tubular member *a* and their ends are bent inwardly at *n* to form an angular engaging ridge which will engage with the sides of a hole in a panel, see Fig. 11. When this form of the device is inserted into a hole in a panel *i* the ridge shaped engaging portions *n* of the fingers will resiliently engage the sides of the said hole, see Fig. 12.

Figure 11:
Figures 11 and 12 are views in side elevation and sectional side elevation, respectively, showing other forms of resilient engaging members on the tubular portion of the device.
Figure 12:

In Figure 12, the ridge shaped engaging portions of the resilient fingers are shown somewhat longer than the corresponding parts in Figure 11 and the said engaging portions extend nearer to the flange *b* whereby they will resiliently engage the sides of a hole in a thin panel.

I claim:

1. A ventilating device for inserting in apertures in doors, walls and other structures, comprising a tubular member formed of resilient material, a flange formed integrally with and projecting outwardly from the outer end of the tubular member, a covering of foraminous material secured to the flanged end of the tubular member, a series of longitudinal disposed fingers formed by spaced incisions extending longitudinally from the inner end of the tubular member near to the flange thereon, said fingers having outwardly bent portions forming circumferential engaging members which converge towards the ends of the fingers and are adapted to grip the sides of an aperture when the device is thrust therein.

2. A ventilating device according to claim 1 wherein the ends of the longitudinally disposed resilient fingers are bent outwardly to form a series of angle shaped circumferential engaging members about the inner end of the tubular member.

3. A ventilating device according to claim 1, wherein the ends of the longitudinally disposed resilient fingers are bent outwardly to form a series of inclined circumferential engaging members around the inner end of the tubular member.

4. A ventilating device according to claim 1, wherein the ends of the longitudinally disposed fingers are bent outwardly to form a series of circumferential bead shaped engaging members about the inner end of the tubular member.

5. A ventilating device according to claim 1 wherein the fingers are bent outwardly at points intermediate their ends to form a series of circumferential ridge shaped engaging members around the tubular member.

6. A ventilating device according to claim 1, wherein the fingers are bent outwardly adjacent to the flange to form ridge shaped engaging members about the circumference of the tubular member.

7. A ventilating device according to claim 1, wherein the inner portions of the fingers are bent outwardly over the outer portions thereof, to form a series of ridge shaped circumferential engaging members about the tubular member.

GEORGE R. SHAW.